United States Patent [19]
Garvert

[11] 3,765,717
[45] Oct. 16, 1973

[54] COVER FOR A PICK-UP TRUCK
[76] Inventor: Clarence F. Garvert, 1013 N. Second St., Garden City, Kans.
[22] Filed: Feb. 11, 1971
[21] Appl. No.: 114,602

[52] U.S. Cl. ............................................. 296/137 B
[51] Int. Cl. ................................................. B60j 7/10
[58] Field of Search .............. 296/137 B, 100, 76; 49/169; 267/154; 135/1 A

[56] References Cited
UNITED STATES PATENTS

| | | | |
|---|---|---|---|
| 2,989,340 | 6/1961 | Penner | 296/100 |
| 3,069,199 | 12/1962 | Reardon | 296/100 |
| 2,871,505 | 2/1959 | Clark | 296/76 |
| 3,047,180 | 7/1962 | Fiala | 296/76 |
| 3,067,453 | 12/1962 | Lyons | 267/154 |
| 3,476,375 | 11/1969 | Brasseur | 296/76 |
| 3,466,082 | 9/1969 | Branch | 135/1 A |
| 3,578,378 | 5/1971 | Anderson | 296/137 B |
| 3,649,072 | 3/1972 | Cross | 296/137 B |
| 2,759,227 | 8/1956 | Reid | 49/169 |

Primary Examiner—Robert R. Song
Attorney—Clarence F. Garvert

[57] ABSTRACT

A cover for a pick-up truck contains two panels which may be swung into a vertical or outward horizontal position. Each panel has two doors to gain access into the load carrying box of the pick-up and attached to each panel and the frame is a torsion assembly to assist in swinging the panels into the vertical or horizontal positions.

4 Claims, 3 Drawing Figures

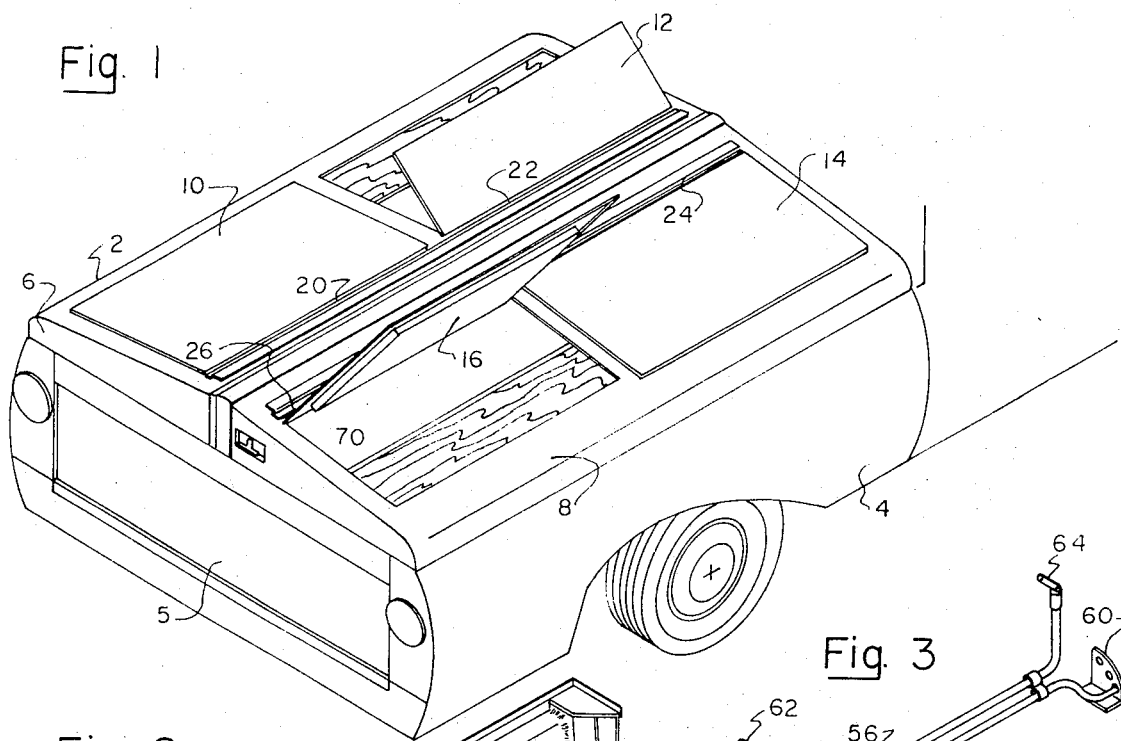
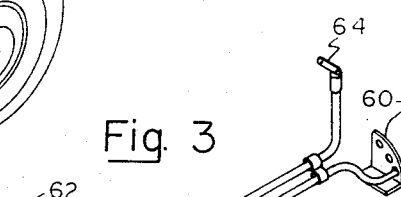
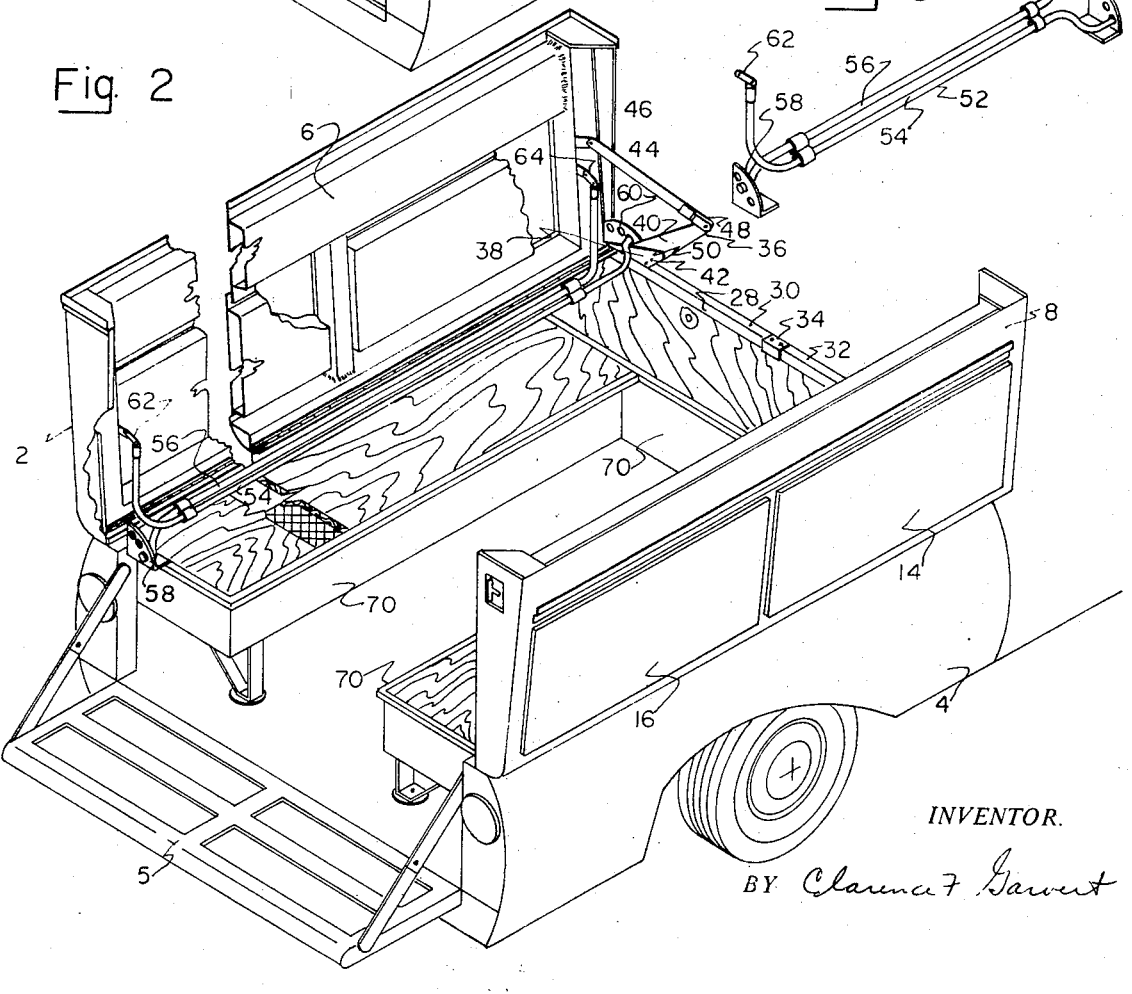
INVENTOR.
BY Clarence F. Garrett 3,765,717

COVER FOR A PICK-UP TRUCK

BACKGROUND OF THE INVENTION

The field of the invention pertains to land vehicles and more particularly to that portion of the vehicle which operates as a receptacle or load carrier together with a top or cover convertible into different forms or shapes to adapt it for different purposes.

In the prior art, covers for pick-up trucks did not provide any ready access into the truck box when the cover was closed. These prior art covers were also very cumbersome and heavy, thus making it difficult to open and close the covers. The covers were supported only by their hinges and any load placed on the covers would break the hinges should the covers be made of a lighter material.

SUMMARY OF THE INVENTION

In accordance with the present invention there is provided a cover for a pick-up truck having two panels which can swing into an upward vertical or outward horizontal position. Two doors are provided in each panel to gain ready access into the interior of the pickup box when the cover is closed. A support means is attached to the frame and each panel to hold the panels in their vertical or horizontal positions. Each panel also has attached to it and the cover frame a means to assist in moving the panels relative to the frame when swinging the panels into their vertical or horizontal outward and closed positions. This means may be a dual torsion assembly connected to the frame and panel which controls the weight of the panels by using torsion bars.

Therefore the objects of the invention are to provide a novel cover for a pick-up truck having doors to gain access to the interior of the pick-up box when the cover is closed, to provide a support means in said cover to secure the panels in various positions, and to provide in the cover a means to assist in moving the panels to their various positions.

Other objects and advantages will be apparent from the following detailed description and accompanying drawing of the preferred embodiment.

BRIEF DESCRIPTION OF THE DRAWINGS

FIG. 1 is a perspective view showing a portion of the pick-up truck with the cover mounted thereon in a closed position with two doors open.

FIG. 2 is a perspective view with a portion broken away showing the cover mounted on a pick-up truck and open to a vertical position.

FIG. 3 is a perspective view of the means to assist in moving said panel relative to the frame or the dual torsion assembly part of the cover.

DESCRIPTION OF THE PREFERRED EMBODIMENT

Referring now to FIG. 1 a cover 2 is shown mounted on the load carrying box 4 of a pick-up truck. The box includes the usual hinge mounted tailgate 5. The cover 2 has two panels 6, 8 and each panel 6, 8 has two doors 10, 12 and 14, 16 respectively, attached by means of hinges 20, 22 and 24, 26 respectively, to allow access into the interior of the pick-up box 4 when the panels are closed.

As shown in FIG. 2, the panels 6, 8 are hinge mounted to a U-shaped frame 28 so as to be able to swing outward along the longitudinal parallel sides of the load carrying box 4, when the cover 2 is attached to the pick-up. The U-shaped frame 28 fits along the front and parallel longitudinal sides of the load carrying box 4 and may be secured thereto, preferably in the interior of the box, by any suitable means, such as bolts or screws, not shown. To compensate for minor deviations in the widths of various pick-up boxes the frame 28 is constructed of hollow square tubing in the bottom of the U (at the front of the pick-up box) and is halved into two symmetrical L sections 30, 32. A hollow extension 34, fits in telescoping relationship over the two sections 30, 32 and is secured thereto by bolts to provide an adjustable width to the cover.

In order to hold the panels 6, 8 in a vertical or in an outward horizontal position a support means 36 is attached between each panel and the frame 28. The support means 36, shown attached to panel 6, includes a flange 38 on frame 28, a triangular shaped plate 40 attached to flange 38 to rotate about pivot 42 in a parallel sliding relationship, and an arm 44 attached at its one end to the panel 6 to rotate about pivot 46 and attached at its other end to plate 40 to form a pivot 48. Holes (not shown) in plate 40 are provided to register with hole 50 in flange 38 when the panel 6 is in a vertical or outward horizontal position. A lock pin may be placed through hole 50 in flange 38 and a corresponding hole in plate 40 to support the panel in either the vertical or outward horizontal positions. A mirror image support means is provided for panel 8.

The Cover 2 includes a means to assist in moving the panel relative to the frame. Such a means may be an adjustable dual torsion assembly 52 as shown in FIG. 3. The torsion assembly 52 includes two torsion bars 54, 56 two right angel plates 58, 60 and two links 62, 64. Each torsion bar 54 and 56 is bent at right angles at both ends. At one end a lug projects out from each torsion bar. The two right angle plates 58, 60 each have a series of holes arranged in an arc. As shown in FIG. 2 angle plate 58 is secured to frame 28 at the top of one leg of the U and angle plate 60 is secured to frame 30 at the bottom of the U. The lug on torsion bar 56 fits into one of the holes of angle plate 58 and torsion bar 56 is attached at its other end to the forward end of panel by means of link 64. The lug on torsion bar 54 is fitted into one of the holes on angle plate 60 and torsion bar 54 is attached to panel 6 at it's rearward end by means of link 62. The torsion assembly provides an assist in lifting the weight of panel 6 uniformly throughout it's length when moving the panel to vertical or horizontal outward or horizontal closed positions. By positioning the lugs in the different holes in angle plates 58, 60 the degree of assist in controlling the weight of the panel from the torsion assembly may be varied. The torsion assembly 52 also helps to transfer loads imposed on the panel when in a horizontal outward position back into the frame 28 attached to the pick-up. A mirror image torsion assembly is provided for panel 8.

The four doors, 10, 12, 14, 16 operate independently of each other and can be locked for theft protection. The cover provides an all-weather cover for the pick-up bed. The two panels 6, 8 can be locked from the inside to prevent their being opened. The tail gate 5 can be lowered without interference to the cover itself.

If it is desired to haul a tall or bulky load, the two panels are moved to the vertical position and locked into position by the support means 36. The frame 28 may contain sockets to affix tubing or bars, providing the equivalent of a "headache" rack.

If it desired to use the pick-up for camping the panels may be moved to the outward horizontal position. A tent and bow attachment may be affixed to each panel and when erected, provides ½ tent for each panel. These two tent-halves are locked into position at the top, with zippers for each end which makes an all-weather tent affixed to the pick-up cover.

Supply boxes 70 may be placed across the front of the pick-up bed, as well as on the right and left side of the pick-up bed. The right and left side boxes may be interchangeable.

As is readily evident this cover has a great deal of versatility and can be used for farm, camping, or industrial use.

While various modifications and changes will occur to those skilled in the art after a study of the present disclosure I intend to be limited only by a broad interpretation of the attached claims:

1. A cover for a load carrying box of a vehicle comprising: a frame, a first panel hinge mounted to said frame, a second panel hinge mounted to said frame, said panels being pivotable from a horizontal position enclosing said box to a vertical position and then to an outward horizontal position relative to said frame, a support means for holding said panels in said vertical or outward horizontal positions, said first and second panels having openings therein, a first door mounted by a hinge to said first panel to cover the opening therein, a second door mounted by a hinge to said second panel to cover the opening in said second panel, said first and second doors being swingable about said hinges to provide access to the interior of said box when said panels are in a position closing said box.

2. A cover for a load carrying box according to claim 1, wherein said frame is in the shape of a U and comprised of two symmetrical L sections and a hollow extension fitting in telescoping relationship over said L sections and secureable to said L sections, said first panel being mounted to one leg of the U-shaped frame and said second panel being secured to the other leg of said U shaped frame.

3. A cover for a load carrying box according to claim 1, wherein said support means includes a flange on said frame, said flange having a hole therein, a plate pivotably attached to said flange, an arm pivotably attached at one end to said plate and at the other end to one of said panels, said plate having at least two holes therein, one of said holes in said plate registering with said hole in said flange when said one of said panels is in the vertical position, the other of said holes in said plate registering with said hole in said flange when said one of said panels is in the horizontal outward position whereby a pin may be placed through the hole in said flange and one of the holes in said plate to support the panel in either the vertical or horizontal outward positions.

4. A cover for a load carrying box according to claim 1, wherein each of said panels contains two openings therein, and having doors hinge mounted to said panels to cover the openings.

* * * * *